March 26, 1963 S. M. ZIMMERMAN 3,082,625
THERMOMETER
Filed Aug. 19, 1958

INVENTOR
Samuel Morton Zimmerman

BY

ATTORNEY

3,082,625
THERMOMETER
Samuel Morton Zimmerman, 2505 Montalba,
Dallas, Tex.
Filed Aug. 19, 1958, Ser. No. 755,961
1 Claim. (Cl. 73—362)

This invention relates to a thermometer, and it concerns more particularly an electronic thermometer for use by medical personnel in clinics, hospitals, doctors' offices, and the like.

An object of the invention is to provide an electronic thermometer capable of indicating accurately human body temperatures in the range of from about 95 to about 110 degrees Fahrenheit.

Another object of the invention is to provide an electronic thermometer for the purpose described which is of the resistance type, having a temperature-sensitive element whose resistance varies inversely in proportion to changes in temperature, and means for indicating temperatures as reflected by the resistance of the temperature-sensitive element.

Another object of the invention is to provide an electronic thermometer of the type described in which the temperature-sensitive element consists of a pellet formed of high fired manganese oxide containing as impurities controlled amounts of other metal oxides.

Another object of the invention is to provide an electronic thermometer of the type described in which the means for indicating temperatures, as reflected by the resistance of the temperature-sensitive element, consists of a bridge, in which the resistance of the temperature-sensitive element is balanced against a known resistance which is capable of being varied, and having a galvanometer operatively associated therewith whereby the flow of current across the bridge in either direction is indicated by deflection of the magnetic needle of the galvanometer.

Another object of the invention is to provide an electronic thermometer of the type described in which a resistor having precisely the same resistance as the temperature-sensitive element, at a predetermined temperature within the temperature range of the instrument, is arranged in parallel relation to the temperature-sensitive element whereby it may be connected in the circuit, in place of the temperature-sensitive element, by manipulation of a switch, for use in recalibrating the instrument.

Another object of the invention is to provide an electronic thermometer having a temperature-sensitive element which is enclosed within a glass probe whereby it is capable of being readily contacted with internal and external portions of the human body.

Another object of the invention is to provide an electronic thermometer of the type described in which the probe is capable of being boiled for the purpose of sterilizing it before and after use.

Another object of the invention is to provide an electronic thermometer of the type described in which the probe is removable whereby it may be readily replaced.

Another object of the invention is to provide an electronic thermometer of the type described in which the probe is connected by long lead wires and the temperature indicated may be observed at a point which is remote from the temperature-sensitive element.

An advantageous feature of the thermometer of the invention is that it is accurate within 0.05 degree Fahrenheit.

Another advantageous feature of the invention is that it is capable of indicating correct temperatures instantly, within 10 seconds.

A further advantage is that the sensitivity of the instrument is excellent. It reacts to incremental changes in temperature as low as 0.001 degree Fahrenheit.

The instrument is also very easy to read.

The invention will be readily understood by referring to the following description and the accompanying drawing, in which.

Figure 1:
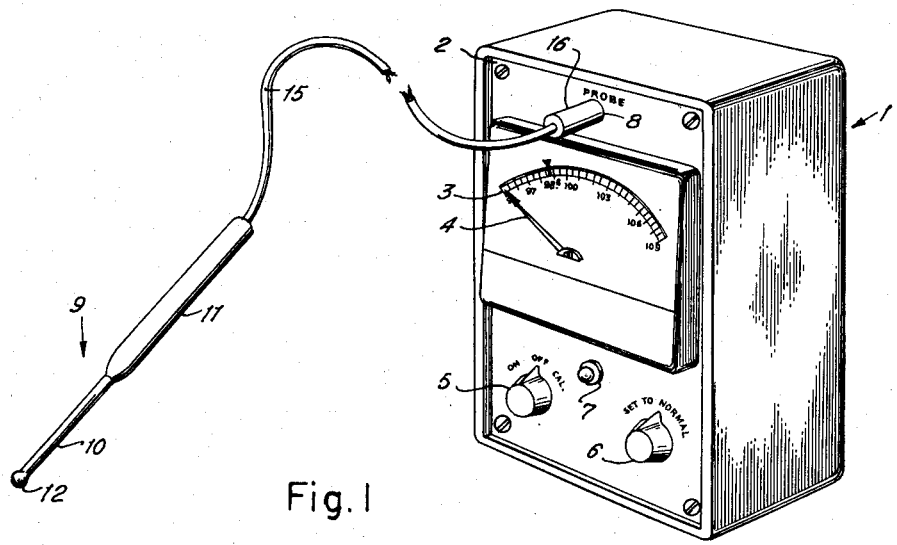
FIG. 1 is a perspective view of a thermometer embodying the invention.

Referring to FIG. 1 of the drawing, the numeral 1 designates generally a cabinet which provides a housing for the thermometer of the invention, exclusive of the probe hereinafter described. The cabinet 1 has a front panel 2, on which is mounted a temperature indicator having a scale 3 and a pointer 4. A switch 5, a variable resistor 6, a pilot light 7, and a jack 8 are also mounted on the panel 2.

Figure 2:
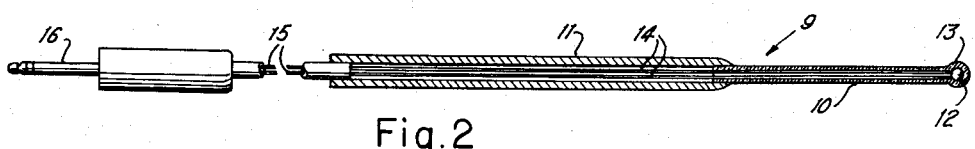
FIG. 2 is a longitudinal view, partly in section taken on a median line, of the probe and its lead wires, showing the plug whereby the probe is removably connected to the remainder of the instrument.
Figure 3:
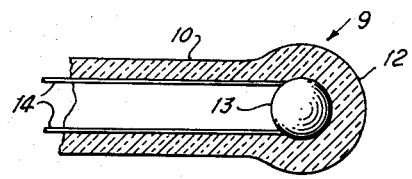
FIG. 3 is a fragmentary view, on an enlarged scale, of the probe shown in FIG. 3.

As shown in FIGS. 1 to 3, a probe, which is indicated generally by the numeral 9, consists of tubular sections 10 and 11, which are connected end to end. The tubular section 10 is formed of highly polished glass, whereby it is readily sterilized by boiling, and is closed at its outer end, which has an enlarged spherical tip 12 thereon. The tubular section 11 is formed of metal, and advantageously may be chromium plated whereby it resists corrosion. A temperature-sensitive element 13, as hereinafter described, which is positioned in the tip 12, is fused to a pair of conductors 14. The conductors 14 extend longitudinally through the probe 9 and are connected by lead wires 15 to a plug 16, which is removably inserted in the jack 8.

The temperature-sensitive element 13 preferably consists of a pellet formed of high fired manganese oxide containing as impurities controlled amounts of other metal oxides, and characterized by a resistance to the flow of electric current which varies inversely in proportion to changes in temperature. Such a temperature-sensitive element is described in Carboloy Thermistor Manual No. TH–13, published by Carboloy Dept. of General Electric Company, Detroit, Michigan (1954), pages 2 and 9.

Figure 4:
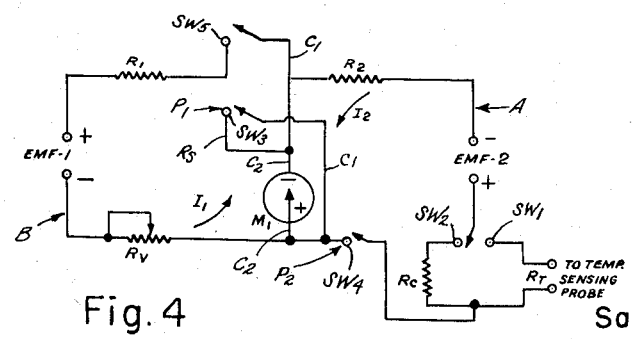
FIG. 4 is an electrical diagram.

The electrical diagram shown in FIG. 4 is schematic. The legends EMF–1 and EMF–2 indicate separate connections to a source of electric power. The arrangement shown is a bridge, in which the resistance of the temperature-sensitive element $R_t$, which corresponds to the element 13 shown in FIGS. 2 and 3, is balanced against the resistance of a variable resistor $R_v$, which corresponds to the variable resistor 6 shown in FIG. 1.

The temperature-sensitive element $R_t$ and the variable resistor $R_v$ are connected in two electrical circuits, designated generally by the letters A and B, respectively, which are similar in other respects and each of which includes also one of the connections EMF–1, EMF–2 and one of two like fixed resistors $R_1$, $R_2$.

The circuits A and B have in common a primary electrical conductor $C_1$ which connects points $P_1$ and $P_2$, which are common to both circuits, and acts as a shunt $R_s$ to the galvanometer. A secondary or bypass electrical conductor $C_2$ connected to the galvanometer is arranged in parallel relation to the primary conductor $C_1$.

The flow of current through the circuit A and the conductors $C_1$ and $C_2$ in one direction, indicated by the arrow $I_2$, is balanced against the flow of current through the circuit B and the conductors $C_1$ and $C_2$ in the opposite direction, indicated by the arrow $I_1$.

A galvanometer $M_1$, which is operatively connected in the secondary or bypass conductor $C_2$, indicates the flow of current between the points $P_1$ and $P_2$, the flow of current through the secondary or bypass conductor $C_2$ being proportional to the flow of current through the primary conductor $C_1$.

The flow of current across the bridge in either direction is indicated by deflection of the magnetic needle of the galvanometer $M_1$, which is the pointer 4 of the temperature indicator shown in FIG. 1. The scale 3 is calibrated in degrees Fahrenheit, and the temperatures indicated correspond to the resistance of the temperature-sensitive element 13.

In setting the instrument preparatory to use, the deflection of the pointer 4 is adjusted, by manipulating the variable resistor 6, so that the instrument accurately indicates a normal body temperature of 98.6 degrees Fahrenheit.

A resistor $R_c$, which has precisely the same resistance as the temperature-sensitive element $R_t$, at a predetermined temperature within the temperature range of the instrument, is arranged in the circuit A in parallel relation to the temperature-sensitive element $R_t$ whereby it may be connected in the circuit A, in place of the temperature-sensitive element $R_t$, by manipulation of the switch 5, for use in recalibrating the instrument.

The switch 5 shown in FIGURE 1 is a double pole, double throw switch having contacts $SW_1$, $SW_2$, and $SW_3$, $SW_5$, shown in FIGURE 4, adapted to be closed selectively upon movement of the switch 5 to one of its closed positions.

As shown in FIGURE 4, the contacts $SW_1$, $SW_2$ are connected in the circuit A, in parallel relation to each other, whereby the temperature-sensitive element $R_t$, or alternatively, the resistor $R_c$ may be operatively connected in the circuit A, as desired, by operation of the switch 5.

The contacts $SW_3$, $SW_5$ are connected in the primary conductor $C_1$, in parallel relation to each other, whereby a circuit is adapted to be completed through the primary conductor $C_1$ and the secondary or bypass conductor $C_2$ in either of the closed positions of the switch 5.

The symbol $SW_4$, shown in FIGURE 4, designates a separate switch in the circuit A at its juncture with the primary conductor $C_1$, on the side of the temperature-sensitive element $R_t$ and the resistor $R_c$ opposite the contacts $SW_1$, $SW_2$, whereby the circuit A may be positively disconnected independently of the switch 5.

The invention may be modified in various ways without departing from the spirit and scope thereof.

What is claimed is:

In an electronic thermometer for clinical use, the combination of a probe consisting of a first tubular section and a second tubular section connected end to end, the first section being formed of highly polished glass, whereby it is readily sterilized by boiling, and having a closed outer end terminating in an enlarged spherical tip, the second section being formed of plated metal, whereby it resists corrosion, a temperature sensitive element in the enlarged spherical tip of the first section consisting of manganese oxide containing as impurities controlled amounts of other metal oxides, and characterized by a resistance to the flow of electric current which varies inversely in proportion to changes in temperature, a pair of electrical conductors each having one of its ends fused to the temperature sensitive element and extending longitudinally through the probe, a pair of long lead wires each connected to one of the conductors and extending outwardly from the end of the probe opposite the temperature sensitive element, and a plug connected to the outer ends of the lead wires for engagement with a jack.

References Cited in the file of this patent

UNITED STATES PATENTS

| | | |
|---|---|---|
| 2,195,019 | Bloomheart | Mar. 26, 1940 |
| 2,271,975 | Hall | Feb. 3, 1942 |
| 2,321,846 | Obermaier | June 15, 1943 |
| 2,375,892 | Bouyoucos | May 15, 1945 |
| 2,685,015 | Weiller | July 27, 1954 |
| 2,753,714 | Perkins et al. | July 10, 1956 |

FOREIGN PATENTS

| | | |
|---|---|---|
| 663,578 | France | Oct. 25, 1927 |

OTHER REFERENCES

Carboloy Thermistor Manual No. TH–13, published by Carboloy Dept. of General Electric Co., Detroit, Michigan (1954), pages 2 and 9.

Science, Mar. 4, 1955, pp. 337–8.

Properties and Uses of Thermistors by Becker, et al., in Electrical Engineering Transactions, November 1946, pp. 711 and 712.

An article entitled Resistance Thermometer Method, in Leeds and Northrop Co. Cat. No. E–33–423 (1939). page 4.